Jan. 12, 1954 J. FRASER 2,665,925
COUPLING DEVICE FOR PIPES OR CONDUITS
Filed July 28, 1950 3 Sheets-Sheet 1
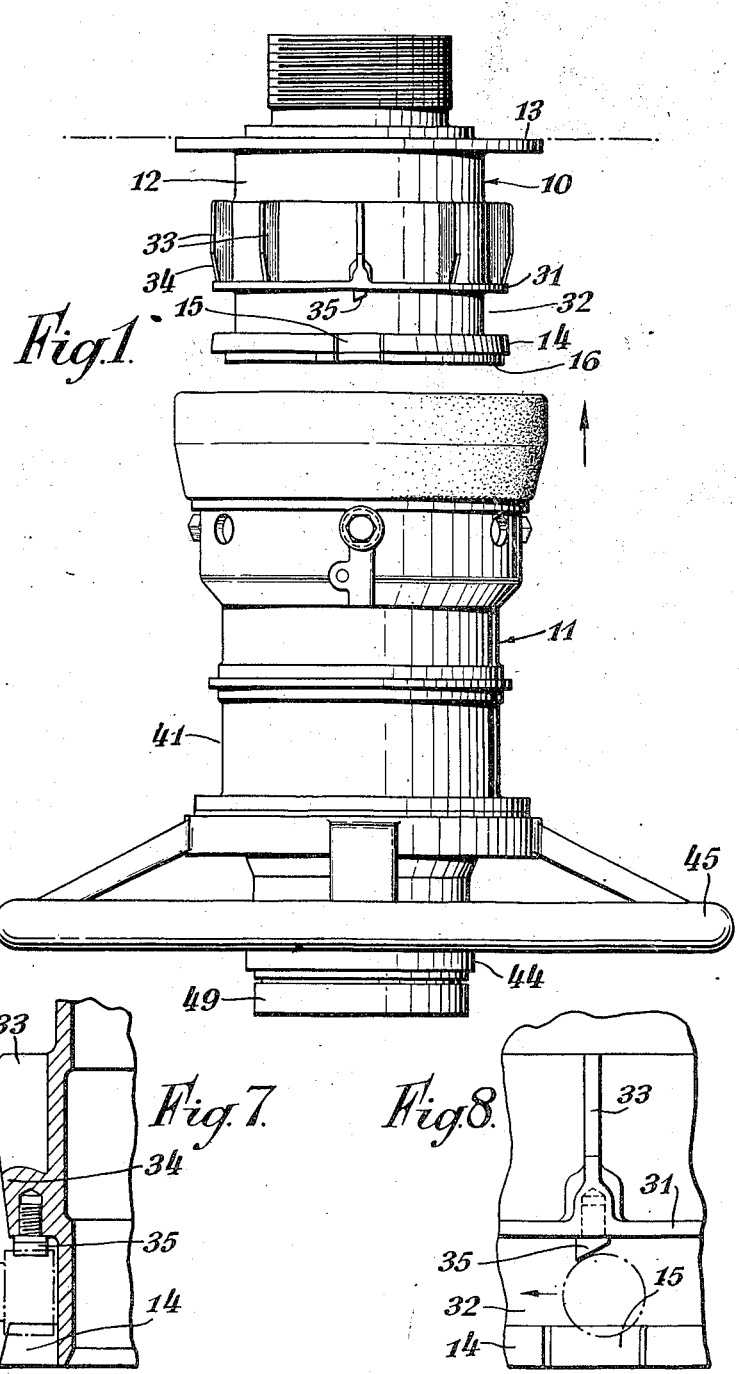
INVENTOR
John Fraser
BY
ATTORNEY Jan. 12, 1954          J. FRASER          2,665,925
COUPLING DEVICE FOR PIPES OR CONDUITS
Filed July 28, 1950          3 Sheets-Sheet 2
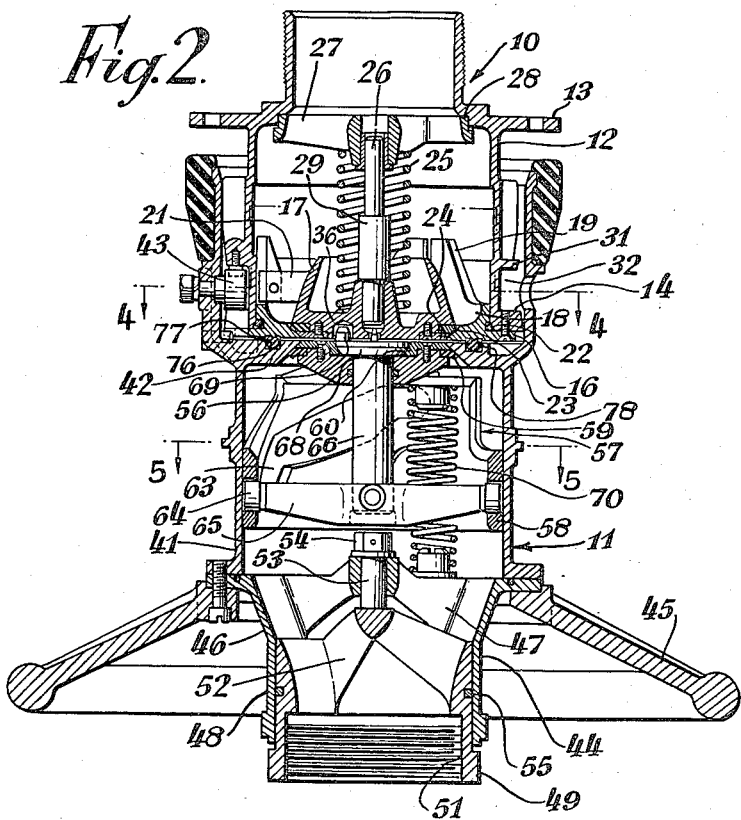
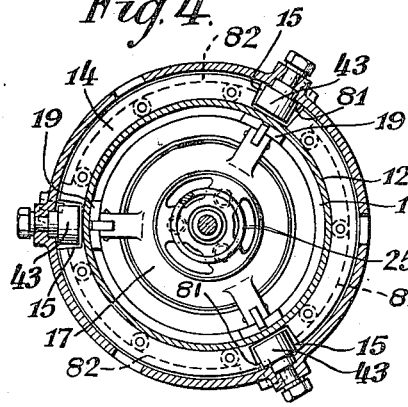
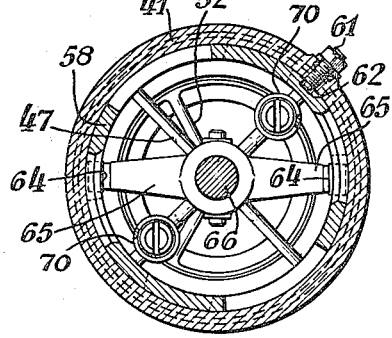
INVENTOR.
John Fraser
BY
ATTORNEY.

Jan. 12, 1954　　　　　　　J. FRASER　　　　　　2,665,925
COUPLING DEVICE FOR PIPES OR CONDUITS
Filed July 28, 1950　　　　　　　　　　　　3 Sheets-Sheet 3
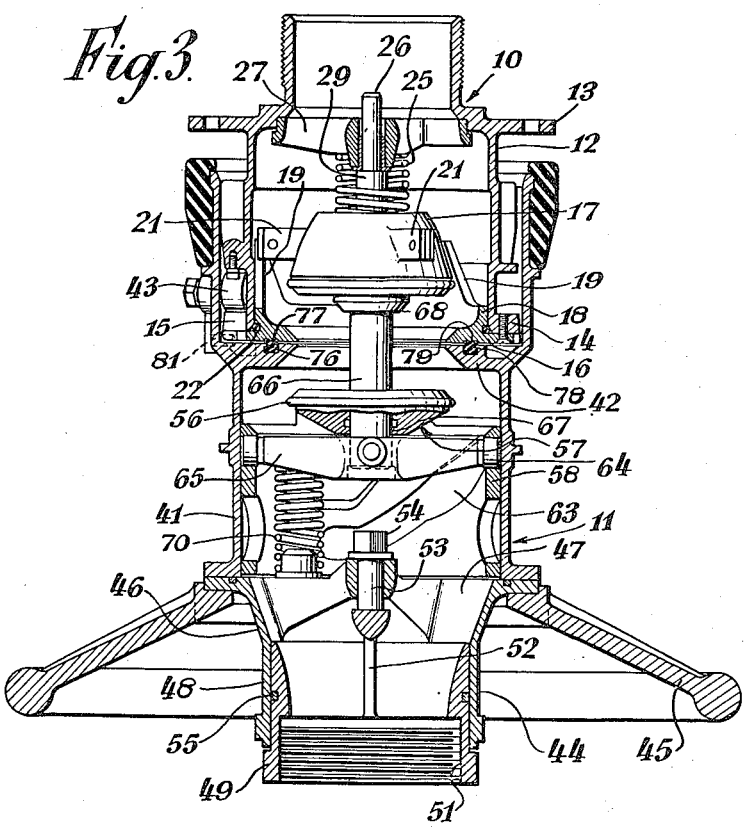
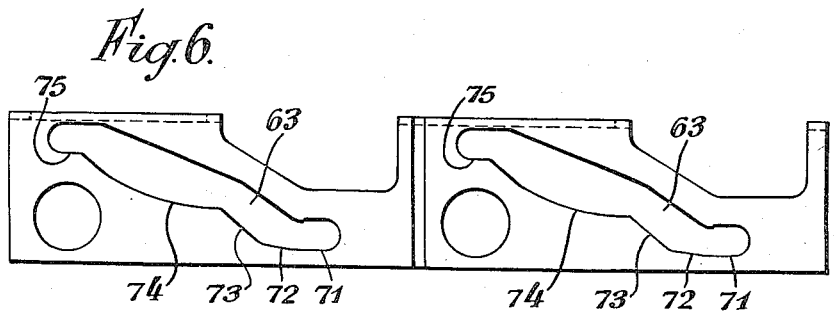
INVENTOR
John Fraser
BY
ATTORNEY Patented Jan. 12, 1954

2,665,925

UNITED STATES PATENT OFFICE 2,665,925

COUPLING DEVICE FOR PIPES OR CONDUITS

John Fraser, Surbiton, England, assignor to Avery-Hardoll Limited, Surbiton, England Application July 28, 1950, Serial No. 176,498

Claims priority, application Great Britain August 2, 1949

8 Claims. (Cl. 284—18)

This invention relates to coupling devices for pipes or conduits, of the kind in which two coupling parts are each provided with a valve which closes the passage through the said part when the parts are separated, the valves, when they are closed and the parts are brought together for coupling, being substantially in contact with each other, so that there is no considerable space between them; and in which the connecting together of the coupling parts; and the opening of the valves, are effected in one operation.

The main object of the present invention is to provide a coupling device of the kind referred to, in which the parts are easily and quickly connected together, there being no screw threads to be engaged. Another object is to provide a relatively simple form of coupling device in which no interlocking mechanism is needed to prevent opening of the valves before the parts are interengaged.

According to the invention, in a coupling device of the kind referred to for pipes or conduits the interconnection of the coupling parts and the opening of the valves are effected by a single purely rotational relative movement of the coupling parts.

Further according to the invention, in a coupling device of the kind referred to for pipes or conduits the coupling parts are connected together by the engagement of radial projections on one of them with annular surfaces on the other, and cam mechanism is provided which, during relative turning movement of the parts effects mutually opposite axial movement of the valves, the arrangement being such that a single relative turning movement of the parts through a fraction of a complete rotation engages the projections in the grooves and operates the cam mechanism.

One of the coupling parts is preferably mounted for rotary movement with respect to a pipe or conduit to which that coupling part is connected, so that relative rotary movement of the coupling parts can be effected without twisting or movement of the said pipe or conduit.

The valves may be restrained against rotation in their respective coupling parts, the cam mechanism, which is located in one of the coupling parts, acting between the valve in that coupling part and a valve operating member adapted to be engaged by the valve in the other coupling part so as to be rotationally coupled thereto.

The invention is hereinafter described with reference to the accompanying drawings, in which:

Figure 1 is an elevation of one form of coupling device according to the invention, the coupling parts being separated.

Figure 2 is a longitudinal section of the coupling device shown in Figure 1, the parts having been brought together but not interengaged;

Figure 3 is a longitudinal section similar to Figure 2 but showing the parts interengaged and the valves open.

Figure 4 is a transverse section on the line 4—4 of Figure 2;

Figure 5 is a transverse section on the line 5—5 of Figure 2;

Figure 6 is a development of the parts in which the cam slots are formed;

Figure 7 is a fragmentary section showing a detail; and

Figure 8 is a partial elevation looking from the left-hand side of Figure 7.

Referring to the drawings, the coupling device illustrated is designed primarily for the connection of aircraft fuel tanks to fuel supplying means on an aerodrome, the connection being made, for example, through apparatus on a vehicle which includes a meter and in some cases a pump for assisting the flow of fuel, the apparatus on the vehicle being connected by one hose to the fuel tanks on the aircraft and by another hose to a supply point on the aerodrome, and the connections being made by coupling devices according to the invention.

The coupling device comprises two parts 10 and 11 hereinafter referred to respectively as the fixed part and the movable part, the former being that which is attached to the supply point or fuel tank inlet and the latter that which is attached to the hose.

The fixed coupling part 10 comprises a cylindrical casting 12 open at both ends and provided adjacent one end with an external fixing flange 13, whilst its other end is also provided with an external flange 14 interrupted at three points as indicated at 15, the edge of the flange 14 being chamfered as shown in Figures 2, 3 and 7. To the flange 14 is bolted an annular disc 16 which forms an internal flange the inner edge of which is chamfered to provide a seat for a valve member 17 adapted to close the passage through the coupling part. The disc 16 has a sleeve portion 18 which enters the end of the casting 12 and is extended at three circumferentially spaced parts 19, the extended parts being slotted longitudinally to receive radial projections 21 on the valve member, and hold it against angular movement relative to the casting. The disc 16 has an external groove at the root of its sleeve portion to receive a packing ring 22 forming a fluid-tight seal between the disc and the casting, and the valve member 17 has a packing ring 23 clamped against a shoulder thereon by a ring 24 bolted to the valve member, the edge of the ring 23 engaging the valve seat when the valve is closed.

The valve member 17 is urged towards its closed position by a spring 25 surrounding a rod 26 and taking its abutment on a spider 27 located in the coupling part against a shoulder 28. The rod 26 has an enlarged portion 29 which co-operates with the central boss of the spider 27 to limit the opening movement of the valve member 17. A flange 31 is formed externally of the coupling part 10, being spaced from the flange 14 to provide a groove 32 between them, and radial wings 33 extend from the flange 31 towards the fixing flange 13, but terminate short of that flange. The outer edges of the wings, at their ends remote from the flange 31 lie on a circle of the same radius as the edge of the flange 14 at its wider face. The parts of the wings 33 adjacent the flange 31 taper inwardly towards the flange, as shown at 34. Three ramps 35 are mounted on the flange 31, one opposite each of the interruptions 15 of the flange 14, as shown in Figures 7 and 8, the ramps 35 having screw-threaded shanks entering tapped holes in enlarged portions of some of the wings 33.

The valve member 17 is formed on its outer face with three recesses 36 spaced 120° apart on a circle co-axial with its centre.

The movable coupling part 11 comprises a tubular casting 41 open at both ends and having an internal annular flange 42 between its ends, the internal diameter of the casting being greater on one side of the flange 42 than on the other. The larger internal diameter of the coupling part 11 is such as to receive, as a free fit, the coupling part 10, and at three equally spaced points about its circumference are located inward projections carrying rollers 43. At its smaller-diameter end the casting 41 is flanged and is bolted through the flange to a sleeve 44 and a hand-wheel 45. The sleeve 44 has a tapering portion 46 from which spring the arms of a spider 47 integral therewith, and a parallel portion 48 in which is fitted an adaptor 49 having a screw-threaded socket 51 to receive the end of a flexible hose, the adaptor 49 having integrally formed with it a spider 52 and a stem 53. The stem 53 passes through the boss of the spider 47, and receives a nut 54 on its screw-threaded end to retain the adaptor in position in the sleeve. The adaptor is grooved externally to receive a packing ring 55 which engages the wall of the sleeve 44.

The flange 42 is chamfered on its inner edge, the chamfered face diverging towards the side of the flange where the casting has the smaller diameter, and this chamfered face forms a seat for the head 56 of a valve member 57 including, in addition to the head, a cylindrical skirt 58 fitting slidably in the bore of the coupling part Openings are provided between the head and the skirt to permit fluid to flow through the skirt and around the valve head. The head 56 has a packing ring 59 clamped between a shoulder therein and a ring 60 bolted to the head, the packing ring 59 engaging the valve seat when the valve 57 is closed. The skirt 58 is restrained against rotation in the coupling part 11 by a set screw 61 projecting into a longitudinal groove 62 in the skirt, and is formed with two cam slots 63, 63 a development of which is shown in Figure 6, and in each cam slot is engaged a roller 64 mounted on one end of a bar 65 extending diametrally across the skirt. The bar 65 is pivotally mounted at its centre on a stem 66 which is guided in a hole 67 in the valve head 56 and carries a disc 68 on the outer side of the valve head, the disc being provided with three projections 69 corresponding in arrangement to the recesses 36 in the valve member 17 of the fixed coupling part 10. The valve member 57 is urged towards its closed position by two springs 70 taking their abutment on the arms of the spider 47.

The cam slots 63, 63 have a stepped profile, as shown in Figure 6, the operative edge of each including a circumferential portion 71 with which the roller 64 engages when the valves are fully closed, and a slightly inclined portion 72 leading from the portion 71 to a more steeply inclined portion 73. The portion 73 terminates somewhat short of a position equivalent to half the total lift of the cam and is followed by a portion 74 in which the lift increases from zero to a maximum corresponding to that of the portion 73. Beyond the portion 74 is a short circumferential portion 75.

The surface of the flange 42 which faces the larger diameter portion of the coupling part 11 is formed with an annular groove 76 to receive a packing ring 77 of round section, which stands slightly proud of the surface of the flange, and is held in place by slight inward deformation of spaced portions of the edges of the groove, as shown at 78 in Figures 2 and 3. The deformed portions are located alternately on opposite edges of the groove. The disc 16 is formed with an annular rib 79 which engages the packing ring 77 when the coupling parts are brought together. Inward radial projections 81 on the coupling part 11 enter cut-away portions 82 of the edge of the disc 15 when the parts are brought together, to limit their relative turning movement.

When the coupling parts are separated, both valve members 17 and 67 are seated, and no liquid can flow through either of the coupling parts.

To couple the parts together, the movable part 11 is brought up to the fixed part 10, the latter entering the larger end of the former and being guided centrally thereinto by the flange 14 and the wings 33. The chamfered edge of the flange, and the inclined portions of the wings prevent the coupling parts from jamming if they are not properly aligned, and ensure easy and quick entry of the one into the other.

The rollers 43 pass through the interruptions 15 in the flange 14 and enter the groove 32, the movement being stopped when they engage the ramps 35. Slight relative rotation of the coupling parts therein brings them to the position shown in Figure 2, where the rollers 43 are just beginning to engage the flange 14, and the rib 79 is pressing on, and deforming, the packing ring 77, but no movement of the valves has taken place. Continued relative movement of the coupling parts causes the rollers 43 to travel along the groove 32, and, as the stem 66 is rotationally coupled to the valve member 17 by its projections 69 seating in the valve recesses 36, the said stem is held against rotation and the rollers 64 are caused to travel along the cam slots 63, thus forcing the valve members apart by camming the stem 66 toward the coupling part 10 to unseat the valve 17 and also camming the valve member 57 away from the part 10 to unseat the head 68, as shown in Fig. 3. Normally, one of the valve members will leave its seat before the other, and will move to its fully open position before the other valve member commences to move, after which movement of the second valve member will commence. The shape of the cam slots ensures that a high mechanical advantage is provided at the middle of the movement as well as at the beginning, so that the valve member which opens second, and is normally that upon which there is the greater fluid pressure acting, can be moved from its seat without difficulty. Figure 3 shows the valve members in the fully opened position. The initial circumferential parts 71 of the cam slots ensure that the rollers 43 are engaged with the flange 14 before the valve members begin to open, and the final circumferential portions 75 prevent the parts from being separated by the thrust of the springs 25 and 70.

Opposite relative rotation of the coupling parts re-closes the valves, and brings the rollers 43 back to a position opposite the interruptions 15 of the flange 14, so that the parts can be separated. As the rollers come into a position opposite the interruptions they strike the ramps 35, thus providing an axial thrust which breaks the joint between the parts at the packing ring 77 and ensures that they separate freely.

What I claim is:

1. A coupling device comprising two tubular coupling members having mutually engaged mating ends, mutually co-operative lock means on said members interengaged by relative rotation of said coupling members to hold said ends in mating relation, a valve seat in the mating end of one coupling member, a valve axially movable in said one coupling member and biased to engage the said valve seat, guide means in said one coupling member holding said valve against rotary movement therein, an axially movable element in the other coupling member, co-operating axial thrust transmitting surfaces on said valve and axially movable element, means detachably coupling said valve and axially movable element against rotation relative to each other, cam means mounted in said other coupling member, means to hold said cam means against rotation relative to said other coupling member, and follower means carried by said axially movable element, said follower means being moved axially by said cam means during relative rotation of the two coupling members to effect axial movement of the axially movable element to open the valve.

2. A coupling device as defined in claim 1 and including a cup-like recess in said other coupling member, the mating end of said other coupling member which engages the one coupling member being formed at the bottom of the said recess, projections on said other coupling member extending radially into said recess, an end portion on said one coupling member removably inserted into the said recess, a first flange on said end portion having interruptions therein for the passage of said projections, a second flange on said end portion axially spaced from said interrupted flange to define therewith a projection receiving groove, said interrupted flange being chamfered to decrease in diameter towards said groove, and axially extending radial wings on said end portion extending from said second flange opposite said groove, said wings engaging the wall of said recess to locate said end portion centrally therein, and said wings being tapered along a portion of their length towards the second flange.

3. A coupling device as defined in claim 2, wherein said radial projections comprise rollers.

4. A coupling member for a coupling device comprising a body, cam means in said body, follower means in said body and engaging said cam means, means to prevent rotation of one of said means relative to said body, an axially movable element in said body and carrying the other of said means, means on said axially movable element to engage a mating coupling member and hold said axially movable element against rotation, and an axial thrust transmitting surface on said axially movable element to engage a valve in said mating coupling member and move said valve axially to an open position.

5. A coupling member for a coupling device comprising a body, an axially movable valve in said body to close the passage therethrough, means to prevent rotation of said valve in said body, cam means on said valve, follower means engaging said cam means, an axially movable element carrying said follower means, means on said axially movabe element to engage co-operating means on a mating coupling member and hold said axially movable element against rotation and an axial thrust transmitting surface on said axially movable element to engage a valve in said mating coupling member whereby relative rotation of the coupling members moves the two valves in opposite directions.

6. A coupling device comprising two tubular coupling members having mutually engaged mating ends, mutually co-operative lock means on said members interengaged by relative rotation of said coupling members to hold said ends in mating relation, an aperture in the mating end of each of said coupling members, a valve seat surrounding each of said apertures, a valve axially movable in each of said coupling members and biased to engage the seat therein, guide means in each of the coupling members holding the valve therein against rotation relative thereto, cam means on the valve in one coupling member, an axially movable element in said one coupling member, follower means carried by said axially movable element and engaging said cam means, means detachably coupling said axially movable element and the valve in the other coupling member against rotation relative to each other, and co-operating axial thrust transmitting surfaces on said axially movable element and the valve in said other coupling member, said axially movable element and cam follower means being turned relative to said one coupling part and cam means during relative rotation of the two coupling parts to move the valves axially in opposite directions.

7. A coupling device comprising two tubular coupling members having mutually engaged mating ends, mutually co-operative lock means on said members interengaged by relative rotation of said coupling members to hold said ends in mating relation, an aperture in the mating end of each said coupling member, a valve seat surrounding each said aperture, a valve axially movable in each of said coupling members and biased to engage the seat therein, guide means in each of the coupling members holding the valve means therein against rotation relative thereto, a sleeve integral with one of said valves and having diametrically opposed cam slots therein, a diametral bar, cam followers one on each end of the said bar each engaged in one of the said cam slots, a valve operating member carried by said diametral bar and projecting through a central aperture in said one valve, means detachably coupling said valve actuating member and the other valve against rotation relative to each other, and co-operating axial thrust transmitting surfaces on said valve operating member and said other valve, whereby the relative locking rotation of the two coupling members moves said followers in said cam slots to unseat both valves.

8. A coupling device as defined in claim 7, wherein said diametral bar is pivotally connected centrally thereof to said valve operating member to permit rocking of said bar, and said end cam followers comprise rollers journalled on the ends of said bar.

JOHN FRASER.

References Cited in the file of this patent

UNITED STATES PATENTS

| Number | Name | Date |
|---|---|---|
| 2,393,489 | Trautman | Jan. 22, 1949 |
| 2,471,798 | Thomas | May 31, 1949 |
| 2,519,358 | Davis | Aug. 22, 1950 |
| 2,543,590 | Swank | Feb. 27, 1951 |

FOREIGN PATENTS

| Number | Country | Date |
|---|---|---|
| 17,543 | Germany | Apr. 26, 1882 |
| 854,220 | France | Jan. 4, 1940 |
| 859,331 | France | June 3, 1940 |